Nov. 25, 1969  D. V. SUMMERVILLE, JR  3,480,243
MOUNTING BRACKET
Filed Dec. 20, 1966
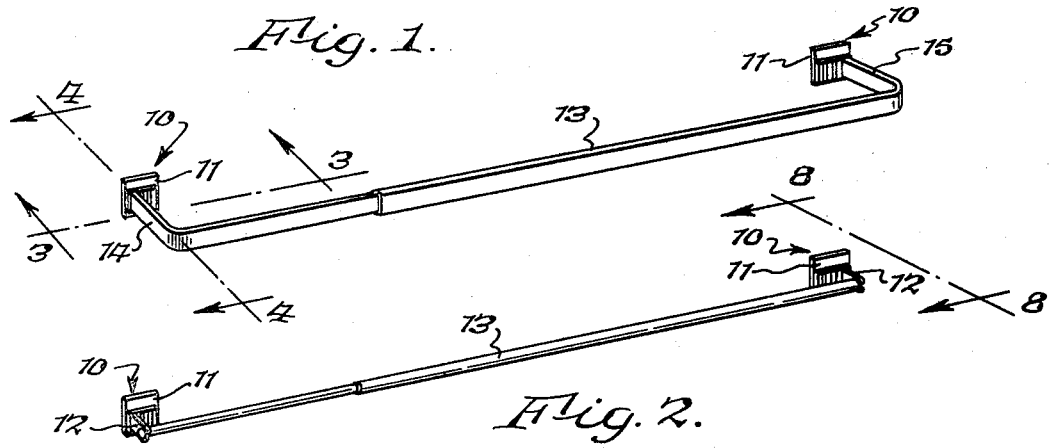
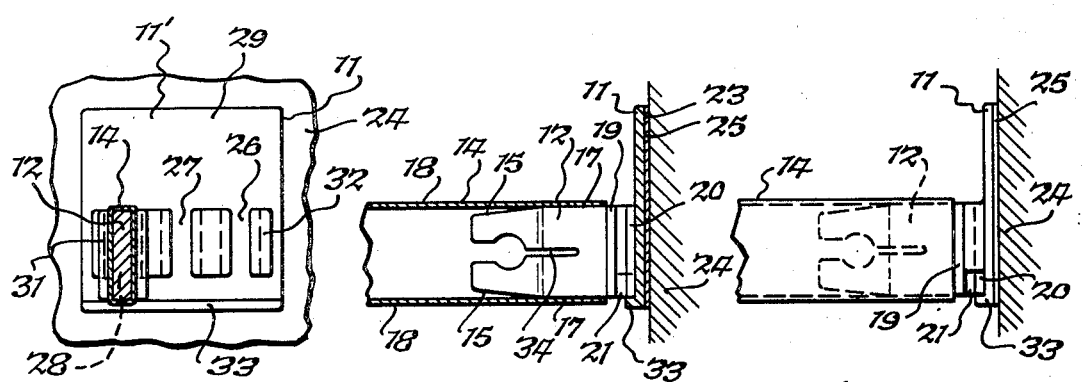
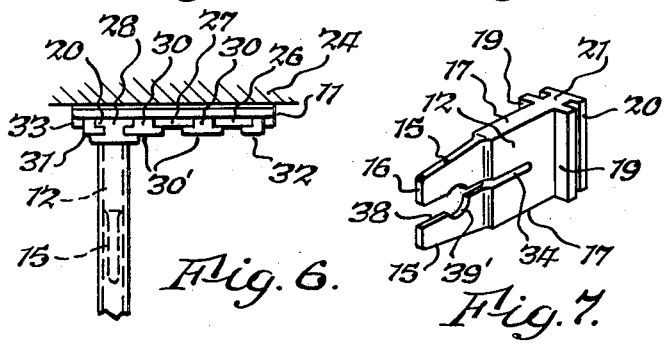
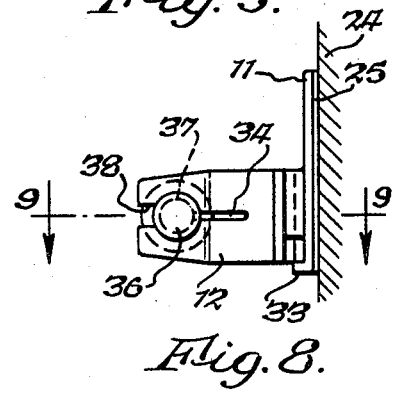
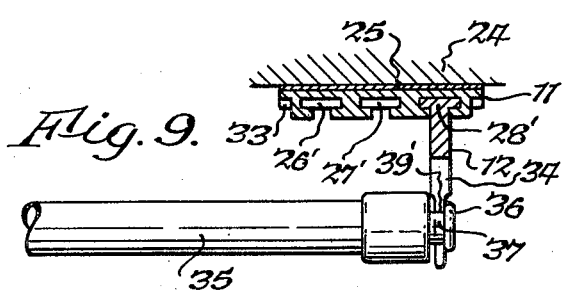
INVENTOR.
Donald V. Summerville, Jr.
BY
Joseph P. Gastel
ATTORNEY.

Nov. 25, 1969  D. V. SUMMERVILLE, JR  3,480,243
MOUNTING BRACKET
Filed Dec. 20, 1966  2 Sheets-Sheet 2
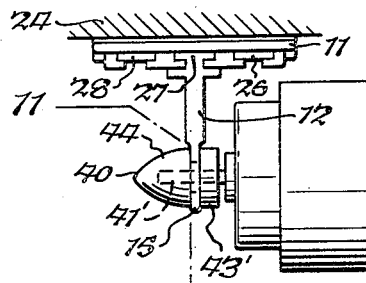
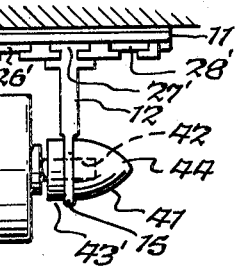
Fig. 10.
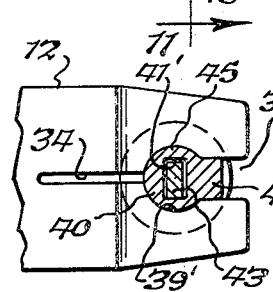
Fig. 11.
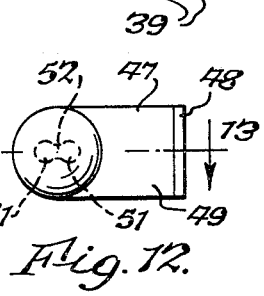
Fig. 12.
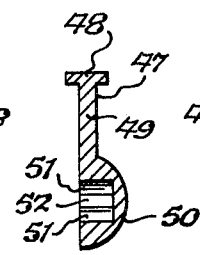
Fig. 13.
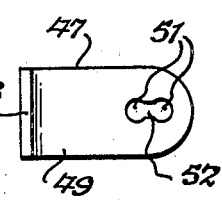
Fig. 14.
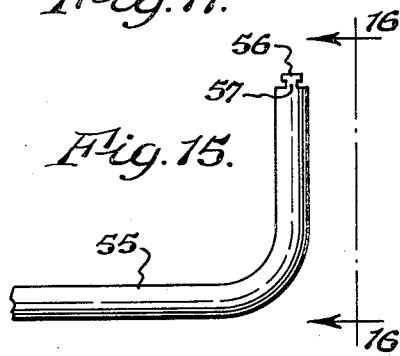
Fig. 15.
Fig. 16.
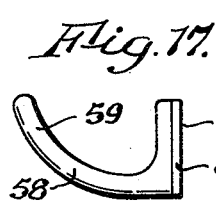
Fig. 17.
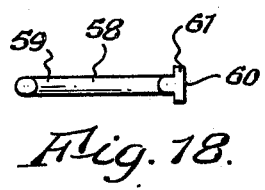
Fig. 18.
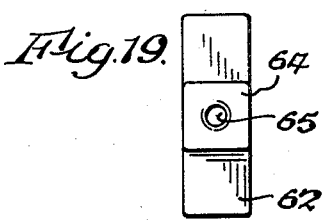
Fig. 19.
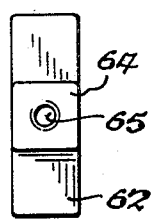
Fig. 21.
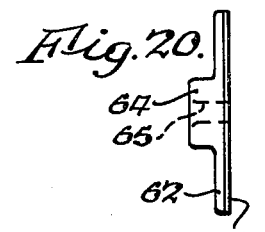
Fig. 20.
Fig. 22.
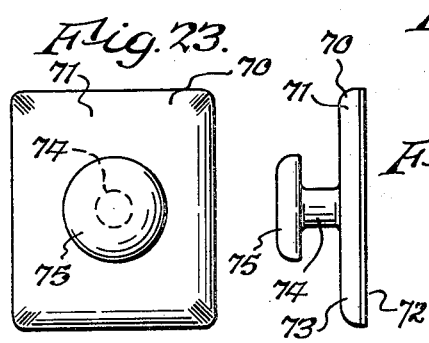
Fig. 23.
Fig. 24.
INVENTOR.
Donald V. Summerville, Jr.
BY
Joseph P. Gastel
ATTORNEY.

United States Patent Office 3,480,243
Patented Nov. 25, 1969

3,480,243
MOUNTING BRACKET
Donald V. Summerville, Jr., Buffalo, N.Y., assignor to Gardco Industries, Inc., Buffalo, N.Y., a corporation of New York
Filed Dec. 20, 1966, Ser. No. 603,240
Int. Cl. A47h 1/102
U.S. Cl. 248—264    13 Claims

ABSTRACT OF THE DISCLOSURE

A molded plastic curtain rod bracket including a base member having pressure-sensitive adhesive for mounting it on a surface and an arm for carrying the curtain rod selectively mountable on the base member by a key-type connection. The arm either has a friction-fit with a hollow curtain rod or an encircling gripping fit with a solid rod. The base member can also selectively carry an arm for supporting a window shade roller or a hook and includes a plurality of keyways so as to be capable of mounting a plurality of supporting arms.

---

The present invention relates to an improved mounting bracket construction, and more particularly, to a molded plastic bracket, attachable to a surface with pressure-sensitive adhesive, for mounting curtain rods and related items.

In the past, the mounting of curtain rod brackets was a relatively inconvenient task. First of all, most curtain rod brackets had to be attached by metal fasteners, such as nails or screws, which marred the window frame. In addition, fastening such brackets to the window frame was difficult because of the relatively small size of the parts which made it difficult to direct the hammer at the nails which had to be driven into the woodwork. To overcome the inconvenience of using nails or screws, there have been attempts made at securing curtain rod brackets to a window frame without the use of such fasteners. These attempts included the use of magnetic brackets on metal window frames; and brackets having a specific, complex configuration for complementary mating, hooking engagement with a window frame. However, the use of the foregoing devices was restricted to specialized window constructions, but could not be universally used on all types., Furthermore, in the past, the curtain rod brackets were generally capable of supporting only a single curtain rod and therefore multiple brackets were required for supporting a plurality of rods. Additionally, each bracket was capable only of supporting a certain type rod but could not be used universally for other types of rods, nor could it be used for supporting other items. The present invention is directed to a mounting bracket construction which overcomes the foregoing shortcomings of the prior art.

It is accordingly one object of the present invention to provide an improved mounting bracket which may be secured to practically any surface with a pressure-sensitive adhesive thereby obviating the marring and difficulty of mounting heretofore experienced with brackets which required the use of nails, screws and other types of penetrating fastening means. A related object of the present invention is to provide an improved curtain rod mounting bracket which is constructed so that very little stress is placed on the bond provided by the pressure-sensitive adhesive during the mounting of the curtain rods, thereby insuring the permanence of the attachment between the bracket and its supporting surface.

Another object of the present invention is to provide an improved mounting bracket for curtain rods which is capable of universal usage in the the same elements can support a plurality of different types of curtain rods, as desired.

A further object of the present invention is to provide a multi-purpose bracket construction which is capable of mounting a plurality of curtain rods on the same base member, thereby permitting a pair of base members to mount either two conventional curtain rods or a conventional curtain rod and a cafe curtain rod, as desired.

A still further object of the present invention is to provide an improved bracket construction which is capable of carrying a window shade roller bracket thereon in addition to the means for mounting a curtain rod.

Yet another object of the present invention is to provide a multi-purpose mounting bracket base which in addition to carrying window shade roller brackets and curtain rod brackets, may also serve as a base for mounting a hook.

Another object of the present invention is to provide an improved mounting hook construction which can be instantaneously placed in position on a surface and used to support any desired item, without having an objectionable amount of projection which can snag foreign objects. Other objects and attendant advantages of the present invention will readily be perceived hereafter.

The present invention relates to an improved molded plastic mounting bracket, primarily for curtain rods, and includes a base member having a pressure-sensitive adhesive on one side thereof for securing said base member to a window frame, wall or the like. The pressure-sensitive adhesive eliminates the need for screws, nails, or other types of woodwork marring fasteners. In addition, it permits the bracket to be mounted on practically any type of surface. A separate arm is provided for engaging the curtain rod, either internally or externally, depending on the type of rod, and a key and keyway connection is provided between the arm and the base member for mounting and demounting the arm on the base member. This type of connection obviates stress on the pressure-sensitive adhesive during mounting and demounting the curtain rod, and thereby enhances the permanence of the adhesion of the pressure-sensitive adhesive. In addition, a plurality of arms may be mounted on a single base member thereby permitting a plurality of curtain rods to be mounted on a single pair of base members. A single pair of base members can also mount two different types of curtain rods, or a curtain rod and a window shade roller. The present invention will be more fully understood when the following portions of the specification are read in conjunction with the accompanying drawings wherein:

FIGURE 1 is a perspective view of the improved mounting bracket mounting a hollow tubular curtain rod;

FIGURE 2 is a perspective view of the improved bracket mounting a cafe type of rod;

FIGURE 3 is a view partially in cross section taken along line 3—3 of FIGURE 1;

FIGURE 4 is a view partially in cross section taken along line 4—4 of FIGURE 1;

FIGURE 5 is a side elevational view similar to FIGURE 4 but taken to the right of line 4—4 of FIGURE 1;

FIGURE 6 is a plan view of the subject matter shown in FIGURE 3;

FIGURE 7 is a perspective view of the bracket arm;

FIGURE 8 is a view taken substantially along line 8—8 of FIGURE 2 and showing the manner in which the bracket arm supports a cafe type of rod;

FIGURE 9 is a view partially in cross section taken along line 9—9 of FIGURE 8;

FIGURE 10 is a fragmentary plan view of an arrangement which may be used for supporting a window shade roller on the brackets of FIGURES 1 to 9;

FIGURE 11 is a view taken substantially along line 11—11 of FIGURE 10;

FIGURE 12 is a side elevational view taken from the right of FIGURE 13 and showing a modified type of bracket arm for supporting a window shade roller;

FIGURE 13 is a view taken along line 13—13 of FIGURE 12;

FIGURE 14 is a view of the arm of FIGURE 13 taken from the left of FIGURE 13;

FIGURE 15 is a view of a curtain rod having a bracket arm portion integral therewith for mounting on a base member such as shown in FIGURES 3 and 6;

FIGURE 16 is a view taken along line 16—16 of FIGURE 15;

FIGURE 17 is a side elevational view of a hook which may be mounted on the base member shown in FIGURES 3 and 6;

FIGURE 18 is a plan view of the hook shown in FIGURE 17;

FIGURE 19 is a front elevational view of a bracket which may be placed on the inside of a window frame for supporting one end of a window shade roller;

FIGURE 20 is a side elevational view of the bracket shown in FIGURE 19;

FIGURE 21 is a front elevational view of a bracket used in conjunction with the bracket of FIGURES 19 and 20;

FIGURE 22 is a side elevational view of the bracket shown in FIGURE 21;

FIGURE 23 is a front elevational view of a hook bracket for mounting on a wall or the like; and FIGURE 24 is a side elevational view of the bracket shown in FIGURE 23.

In FIGURES 1 to 9, one form of the improved mounting bracket of the present invention is disclosed. The improved mounting bracket 10 includes a molded nylon base member 11 including a body portion 11' and a molded nylon arm or supporting member 12 which is selectively mountable thereon. As can be seen from FIGURES 1 and 3–6, a pair of spaced brackets 10 are shown mounting a telescoping type of curtain rod 13 having opposite hollow end portions 14 and 15 which fit on arms 12 with an interference fit. In this respect it can be seen that arm 12 includes converging edge portions 15 which are spaced closer than the internal dimension of rod end 14, so that the end 16 (FIG. 7) of the arm may be easily inserted within tubular rod ends 14 and 15. The distance between edges 17 is slightly greater than the internal spacing between edges 18 of rod end 14, so that after arm is forced into the position shown in FIGURE 4, it will be retained therein by a good friction fit. A slot 34 extends centrally of arm 12 to permit edges 17 to be biased toward each other and thereby provide a spring action in the arm tending to hold it firmly within rod ends 14 and 15. Flanges 19 are provided on arm 12 to act as a stop for rod end 14. In other words, after the edge of the rod end abuts flanges 19, arm 12 and rod end 14 are in proper position relative to each other for subsequent mounting on base member 11. Arm 12 terminates in a key 20 connected to flanges 19 by means of reduced cross sectional neck portion 21. When arms 12 are in mounted position, keys 20 provide a blunt surface to the ends 14 and 15 of rod 13 so that the curtain to be mounted on rod 13 can be slipped over these members without snagging. Arms 12 essentially become a permanent part of rod 13 after they are once inserted, but they may be removed, if desired.

It is also to be noted that arms 12 are symmetrical about their longitudinal axis so that it makes no difference how they are placed within curtain rod ends 14 and 15, as their ultimate positioning will always be the same.

Base member 11 includes a rear surface 23 which, in use, is mounted in contiguous relationship to mounting surface 24, which may be a window frame, a wall or any other surface. Substantially planar surface 23 is coated with a pressure-sensitive adhesive 25 which will cause base member 11 to adhere firmly to any surface on which it is pressed. The layer of adhesive is sufficiently thick to compensate for slight irregularities of surface 24. A pressure-sensitive adhesive 25 which has been used successfully is manufactured by the 3M Company and is identified by their code No. Y–9130D. This adhesive is coated onto surface 23 and is covered by a wrapper which may be peeled therefrom prior to mounting base member 11 on its supporting surface. By the use of a pressure-sensitive adhesive of the foregoing type, nails, screws or other fastening members are eliminated, thereby permitting the mounting of base members 11 in a rapid and simple manner without marring the supporting surface. The strength of adherence of base members 11 is such that they will support a weight five to six times the normal weight of the curtains mounted on rod 13 without failing. However, in the event the base members 11 are to be reused, they can be pulled from their supporting surface with a sufficient force to effect such removal and thereafter can be remounted.

After base members 11 have been mounted on a supporting surface 24, and after a pair of arms 12 have been inserted within ends 14 and 15 of curtain rod 13 and the curtain has been mounted on rod 13, keys 20 of arms 12 are slid into suitable keyways on base member 11. In this respect it is to be noted that three keyways 26, 27 and 28 are located in parallel relationship to each other on front surface 29 of one base member 11 and corresponding keyways 26', 27' and 28' are located in the other base member 11 (see FIGURE 10). These keyways are formed by the coaction between T-shaped central members 30 and facing end L-shaped members 31 and 32, as can best be seen from FIGURE 6.

A can be seen from FIGURE 6, key 20 of arm 12 is received within keyway 28 formed by adjacent T-members 30 and 31. Key 20 will slide downwardly within keyway 28 until such time as it abuts ledge 33 located underneath the three keyways 26, 27 and 28. It can be seen from FIGURES 1, 3 and 6 that the three keyways permit the arms 12 to be located in any desired position. More specifically, if a single curtain rod 13, such as shown in FIGURE 1, is being used, arms 12 may be slid into the outermost keyways 28–28'. If double curtains are to be hung, one rod 13 may occupy the position shown in FIGURE 1 and an inner rod will be received within the inner keyways 26–26'. Also, if a single curtain rod is to be used, the ends thereof may be received in central keyways 27–27' of base members 11. It can readily be seen that curtain rod 13 having arms 12 securely mounted within the ends thereof can be selectively mounted and demounted from base members 11 by merely slipping them upwardly to move keys 20 out of the keyways in which they are located. The simple sliding fit tends to minimize any stress on the base members, which would otherwise be encountered in mounting and demounting the rods, if the arms 12 were integral with base 11. In other words, it is the making of brackets 10 in two parts 11 and 12 which enhances successful use of the pressure-sensitive adhesive because the mounting and demounting of the curtain rods does not place any great amount of stress on base members 11 because of the simple sliding fit between arms 12 and base members 11. It is to be noted that there is a slight clearance between the keys and the keyways and between the neck 21 and the outer portions 30' of T-members 30 to compensate for any slight misalignment of the base members during installation. In addition, it is to be noted that flanges 19 of arms 12, in conjunction with keys 20, bracket the portions 30' of the T-members 30, to provide a good fit of arms 12 on base member 11.

In FIGURES 2, 8 and 9 there is a showing of how the arms 12 may support a cafe curtain rod 35 having button-like ends 36 connected to the remainder of the rod by a reduced neck portion 37. As can best be seen from FIGURES 7 and 8, a slot 38 leads from edge 16 to substantially circular cutout 39 which in turn leads to slot 34. Cutout 39 is of slightly less diameter than neck portion 37 and slot 38 is also of less diameter than neck portion 37. To mount the end of rod 35 on arm 12 it is merely necessary to force neck 37 into slot 38, which will tend to spread the portions of the arm bounded by edges 15 apart until such time that neck 37 seats within cutout 39′, and at this time the opposite halves of the arm 12 will tend to snap together to hold neck 37 locked within cutout 39′. As noted above, the foregoing resilience is due to slot 34 and the inherent springiness of the material. To remove rod 35 it is merely necessary to raise arms 12 out of the keyways in which they are received in base members 11 and thereafter merely pull them in a direction substantially perpendicularly away from the axis of rod 35 until the arms snap off of the rods. It can readily be seen from a comparison of FIGURES 2 and 1 that arms 12 mounting rods 35 may be placed in the inner slots, such as 26–26′ (see FIG. 10) and thereafter a rod, such as 13 in FIGURE 1, may be mounted, as described in detail above, in outer slots, such as 28. This provides a single bracket construction for hanging a curtain on cafe rod 35 and a valance on rod 13. If desired, inner and outer curtain rods such as type 13 may be mounted on arms 12 extending from keyways 26–26′ and 28–28′.

In FIGURES 10 and 11 there is shown a construction which can be used for mounting a window shade roller 39 on arms 12 which are received on spaced base members 11. In this respect bearings 40 and 41 are provided. They are identical in all respects except that bearing 40 contains a rectangular hole 41′ therein whereas bearing 41 contains a circular bore 42 for receiving the round pin extending from one end of roller 39. Hole 41′ receives the rectangular pin 43 extending from the opposite end of roller 39. Each of the bearings 40 and 41 contain a collar 43′ which fits on the inside of arms 12 and an outer housing portion 44. Collar 43′ and housing portion 44 of each bearing is connected by a neck portion 45 (FIG. 11) which is of slightly larger diameter than the circular cutout 39′ in arm 12. Neck portion 45 is also of slightly greater diameter than slot 38 leading to circular cutout 39′. In order to install window shade roller 39 on base members 11, it is merely necessary to first mount bearings 40 and 41 on arms 12 and locate the pins at the ends of the roller in the bearings. Thereafter, arms 12 are slid into corresponding slots, such as 27–27′ in FIGURE 10. It is to be noted that bearing 40 includes a key 46 extending laterally from neck 45 with said key being received in slot 38 to prevent bearing 40 from rotating, this being required for suitable operation of window shade roller 39, as is well understood.

In FIGURES 12, 13 and 14 a modified type of arm, or supporting member, 47 is shown for mounting a window shade roller, such as 39. This arm includes a key 48 mounted on one end of body portion 49. This key is received within any one of keyways 26, 27 or 28 of base member 11. The end of arm 47 remote from key 48 is formed into a substantially hemispherical member 50 having two substantially cylindrical bores 51 connected by a slot 52. Either one of bores 51 can receive the round pin extending from one end of a window shade roller 39, whereas the flat pin, such as 43, will be received in slot 52 and either one of bores 51. By virtue of the fact that a portion of flat pin 43 is received in slot 52, it cannot rotate. In order to install a window shade roller 39 on base members 11 by the use of arms 47, it is merely necessary to place the pins on the opposite ends of roller 39 into the arms and thereafter slide keys 48 of the arms into suitable keyways in base members 11, which have been previously mounted on the wall.

It can readily be seen that a pair of spaced base members 11, such as shown in FIGURE 10, can receive the arms for supporting the window shade roller in spaced slots 26–26′ and a curtain rod may be mounted on base members 11 on arms which fit into spaced slots 28–28′. Thus, a pair of base members 11, each carrying two arms can carry a window shade and curtain.

In FIGURES 15 and 16 a modified curtain rod 55 is shown having a key 56 extending from neck 57 extending from rod 55, which may be cast out of plastic or which may be made out of metal and have elements 56 and 57 formed as a permanent part thereof.

In FIGURES 17 and 18 an improved hook, or supporting member, 58 is shown having a hook portion 59 and a mounting portion 60 consisting of a key 61 which is received in any one of keyways 26, 27 or 28 of a base member 11. Hook 58 is made out of molded nylon or any other suitable molded material. It can therefore be seen that base members 11, in addition to having the uses enumerated above, can also be used to support a hook, such as 58. The hook 59 may be installed or removed from base member 11, as desired.

In FIGURES 19–22 an alternate form of window shade roller bracket is shown. This alternate form consists of a first bracket body 62 having a pressure-sensitive adhesive 63, which is the same as adhesive 25, mounted on one surface thereof and the other surface being formed with a protuberance 64 extending therefrom with a bore 65 therein for receiving the round pin extending from one end of a window shade roller. Bracket 62 is caused to adhere to the inside surface of a window frame, that is, the surface extending substantially perpendicularly to the window itself. A companion bracket 66 includes, on one surface thereof, pressure-sensitive adhesive 67, which is the same as adhesive 25, and the other surface includes a protuberance 68 having a curved slot 69 therein for receiving the flat pin at the end of the window shade roller opposite to the round pin. Bracket 66 is caused to adhere to the side of the window frame opposite to the side on which bracket 62 is mounted.

In FIGURES 23 and 24 an improved pressure-sensitive hook 70 is shown which consists of a base member 71 having pressure-sensitive adhesive 72, which is the same as adhesive 25, covering one surface thereof. From the surface 73 which is on the opposite side of body member from adhesive 25, a neck 74 extends which mounts a button-like member 75. The hook 70 is formed of molded nylon. Hook 70 can be used as a curtain tieback pin or to hang a metal hanger or any other item which can fit over neck 74 and be retained thereon by button 75. It will be appreciated that the hook 70 has the advantage of not providing a sharp point which can snag or otherwise catch foreign objects.

It can thus be seen that the improved mounting bracket of the present invention is manifestly capable of achieving the above enumerated objects, and because of its two-piece construction can use pressure-sensitive adhesive for mounting the base member on a supporting surface because the bond is subjected to very little stress when the bracket arm is mounted and demounted relative thereto. In addition, because the bracket is made in two parts, various type of supporting arms can be used on the bracket base so that the mounting bracket can be used for supporting curtain rods of various types, window shade rollers, or hooks.

The dimensions of various components are as follows: Base member 11 is approximately 1½″ square. The rear wall of base member 11 is approximately 1/16″ thick. Arm 12 is approximately 1 3/16″ long and 23/32″ wide at its widest point, and is approximately ⅛″ thick. Key 20 is ¼″ wide and the distance between the outer edges of flanges 19 is 5/16″.

While preferred embodiments of the present invention have been disclosed, it will be appreciated that the present invention is not limited thereto.

I claim:

1. An arm for supporting a curtain rod comprising an elongate body portion, key means mounted at one end of said elongate body portion for attachment to a base member, means on said arm for supporting a curtain rod, comprising first means on said arm for providing fitting engagement with the inside of a hollow curtain rod, and second means on said arm for providing supporting engagement with the outside of a solid type of curtain rod, said second means comprising a first slot extending inwardly of said arm from the edge thereof, a cutout portion in communication with said first slot for receiving said solid type of rod, and a second slot in said body portion on the opposite side of said cutout means from said first slot for providing resilience to said arm by permitting the portions of said arm on opposite sides of said second slot to move relative to each other.

2. An arm for supporting a curtain rod as set forth in claim 1 wherein said arm includes a longitudinal axis and wherein said first and second slots and said cutout means lie substantially on said longitudinal axis and wherein said key means comprises an elongated key-like member extending substantially perpendicularly to said longitudinal axis.

3. An arm for supporting a curtain rod as set forth in claim 1 wherein said elongate body portion includes a longitudinal axis and an end remote from said key means, and wherein said key means comprises an elongated key-like member extending substantially perpendicularly to said longitudinal axis and wherein said arm is of greater depth than width, and wherein said arm includes a portion which tapers along its depth dimension toward said remote end.

4. A curtain rod bracket comprising a base member having a first surface for placement in contiguous relationship to a supporting surface, a second surface on the opposite side of said base member from said first surface, arm means extending from said second surface for supporting a curtain rod, mounting means for selectively mounting and demounting said arm means relative to said base member comprising a keyway on said base and a key on said arm means, said arm means comprising an elongated member with said key being formed at the end thereof, first stop means on said base member for limiting movement of said key into said keyway to thereby locate said key on said second surface, outer edge portions on said elongate member for effecting a telescoping friction-fit with the inside of a hollow curtain rod, and second stop means on said elongate member for limiting the amount of movement of said elongate member into said hollow curtain rod.

5. A curtain rod bracket as set forth in claim 4 including pressure-sensitive adhesive on said first surface for causing said base member to adhere to said supporting surface, said mounting means tending to minimize stress on said pressure-sensitive adhesive occasioned as a result of mounting and demounting said curtain rod relative to said base member.

6. A curtain rod bracket as set forth in claim 4 wherein said elongate member includes an end remote from said key and wherein a portion of said elongate member between said opposite edge portions tapers toward said remote end.

7. A curtain rod bracket as set forth in claim 6 including a slot in said elongate member extending from said remote end toward said key to cause said elongate member to be resilient to permit said edges to be moved toward each other.

8. A curtain rod bracket as set forth in claim 4 wherein said elongate member includes an end remote from said key, a slot in said elongate member extending from said remote end toward said key to cause said elongate member to be resilient to permit said edges to be moved toward each other.

9. A curtain rod bracket as set forth in claim 5 wherein said elongate member includes an end remote from said key and wherein a portion of said elongate member between said outer edge portions taper toward said remote end, and a slot in said elongate member extending from said remote end toward said key to cause said elongate member to be resilient to permit said edges to be moved toward each other.

10. An arm for supporting a curtain rod comprising an elongate body portion, key means mounted at one end of said elongate body portion for attachment to a base member, said body portion including a longitudinal axis and being of greater depth than width and including opposite faces across its width and opposite edges across its depth, an end on said body portion remote from said key means, and slot means located between said edges extending between said faces from said remote end toward said key means to cause said body portion to be resilient and permit said edges to be moved toward each other and a tapered portion along said edges extending toward said remote end.

11. An arm for supporting a curtain rod as set forth in claim 10 wherein said key means comprise a key-like member extending substantially perpendicularly to said longitudinal axis.

12. An arm for supporting a curtain rod as set forth in claim 10, and a base for detachably mounting said arm including a body member having a first surface for placement in contiguous relationship to a supporting surface, pressure sensitive adhesive on said first surface for causing said body member to adhere to said supporting surface, a second surface on the opposite side of said body member from said first surface, and second slot means on said second surface for removably receiving said key means.

13. An arm as set forth in claim 11 including flange means extending outwardly from said elongate body portion in spaced relationship to said key-like member.

References Cited

UNITED STATES PATENTS

| | | | |
|---|---|---|---|
| 2,292,959 | 8/1942 | Monson | 248—224 |
| 1,502,935 | 7/1924 | Bohrer | 248—260 XR |
| 1,566,882 | 12/1925 | Kirsch | 248—262 |
| 1,953,450 | 4/1934 | Thompson | 248—263 |
| 2,340,521 | 2/1944 | Engert. | |
| 2,371,232 | 3/1945 | Edgington | 248—263 |
| 3,023,991 | 3/1962 | Fisher. | |

ROY D. FRAZIER, Primary Examiner

J. F. FOSS, Assistant Examiner

U.S. Cl. X.R.

248—224